(12) United States Patent
Sundermeier et al.

(10) Patent No.: US 10,597,539 B2
(45) Date of Patent: Mar. 24, 2020

(54) CHROMIUM-FREE COATING FOR THE ELECTRICAL INSULATION OF GRAIN-ORIENTED ELECTRICAL STEEL STRIP

(71) Applicant: Henkel AG & Co. KGaA, Duesseldorf (DE)

(72) Inventors: Uta Sundermeier, Leichlingen (DE); Reiner Wark, Wuppertal (DE); Ramona Hochstrate, Duisburg (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 431 days.

(21) Appl. No.: 14/936,175

(22) Filed: Nov. 9, 2015

(65) Prior Publication Data

US 2016/0060465 A1 Mar. 3, 2016

Related U.S. Application Data

(63) Continuation of application No. PCT/EP2014/056908, filed on Apr. 7, 2014.

(30) Foreign Application Priority Data

May 10, 2013 (DE) .................. 10 2013 208 618

(51) Int. Cl.
| | |
|---|---|
| C09D 5/08 | (2006.01) |
| C23C 22/74 | (2006.01) |
| C23C 22/20 | (2006.01) |
| C23C 22/22 | (2006.01) |
| C21D 8/12 | (2006.01) |
| H01F 1/18 | (2006.01) |

(52) U.S. Cl.
CPC ............ C09D 5/08 (2013.01); C21D 8/1283 (2013.01); C23C 22/20 (2013.01); C23C 22/22 (2013.01); C23C 22/74 (2013.01); *C21D 2201/05* (2013.01); *C23C 2222/20* (2013.01); *H01F 1/18* (2013.01)

(58) Field of Classification Search
None
See application file for complete search history.

(56) References Cited

U.S. PATENT DOCUMENTS

| | | | |
|---|---|---|---|
| 3,856,568 | A | 12/1974 | Tanaka et al. |
| 3,885,978 | A * | 5/1975 | Doi .................. C04B 28/34 |
| | | | 106/690 |
| 4,120,702 | A | 10/1978 | Akerblom |
| 8,038,806 | B2 | 10/2011 | Gunther et al. |
| 2002/0098345 | A1 | 7/2002 | Kamo et al. |
| 2011/0039114 | A1 | 2/2011 | Takahashi et al. |
| 2013/0115444 | A1* | 5/2013 | Sashi ................ C09D 5/084 |
| | | | 428/331 |

FOREIGN PATENT DOCUMENTS

| | | |
|---|---|---|
| CN | 101098984 A | 1/2008 |
| CN | 101443479 A | 5/2009 |
| CN | 101981228 A | 2/2011 |
| CN | 102119239 A | 7/2011 |
| DE | 2247269 A1 | 4/1973 |
| EP | 1752548 A1 | 2/2007 |
| EP | 1903125 A1 | 3/2008 |
| EP | 2022874 A1 | 2/2009 |
| EP | 2180082 A1 | 4/2010 |
| EP | 2182091 A1 | 5/2010 |
| EP | 2186924 A1 | 5/2010 |
| EP | 2264220 A1 | 12/2010 |
| JP | 5386647 A | 7/1978 |
| JP | S54143737 A | 11/1979 |
| JP | 2000026980 A | 1/2000 |
| JP | 200309878 A | 11/2000 |
| JP | 2009052060 A | 3/2009 |
| JP | 201059513 A | 3/2010 |
| WO | 2009123156 A1 | 10/2009 |

OTHER PUBLICATIONS

International Search Report for International Application No. PCT/EP2014/056908 dated Jul. 14, 2014.

* cited by examiner

*Primary Examiner* — Colin W. Slifka

(74) *Attorney, Agent, or Firm* — Mary K. Cameron

(57) ABSTRACT

The present invention relates to an aqueous composition based on phosphates, aluminum ions and other metal ions, in particular manganese ions and zinc ions, as well as silicates, siloxanes or silanes, for providing anticorrosive coatings on metal surfaces, in particular for the electrical insulation of grain-oriented electrical steel strip. For the desired functionality, the compositions according to the invention contain the constituents mentioned in a prescribed ratio to one another. The invention also relates to a method for coating the surface of a metallic workpiece by using the aqueous compositions, wherein the method produces outstanding results, in particular on grain-oriented electrical steel strip, with regard to corrosion protection and adherence.

20 Claims, No Drawings

CHROMIUM-FREE COATING FOR THE ELECTRICAL INSULATION OF GRAIN-ORIENTED ELECTRICAL STEEL STRIP

The present invention relates to an aqueous composition based on phosphates, aluminum ions and other metal ions, in particular manganese and zinc ions, and silicates, siloxanes or silanes, for providing anti-corrosive coatings on metal surfaces, in particular for electrically insulating grain-oriented electrical steel strip. To ensure the desired functionality, the compositions according to the invention contain the described components at a predefined ratio to each other. The invention further relates to a method for coating the surface of a metallic material using the aqueous compositions, wherein the method produces outstanding results, in particular on grain-oriented electrical steel strip, with regard to corrosion protection and adhesion.

At annual worldwide production of approximately 10 million tons, electrical steel is the most significant soft magnetic material in terms of volume and value. It is divided into non-oriented and grain-oriented materials according to its properties. Electrical steel and electrical steel strip, in the narrower sense, also refers to cold-rolled strip made of iron-silicon alloys, and moreover also to the metal lamellae cut or stamped therefrom, which are used to produce magnetic circuits for electrical machines, which is to say iron cores for dynamos, electric motors, transformers, relays, contactors, shunt reactors, ignition coils, electricity meters, and controllable deflection magnets. Grain-oriented electrical steel strip is an important material in the production of energy-efficient transformers and large high-performance generators. It is used wherever motion is transformed into electrical energy or electrical energy is transformed into motion, and where electrical energy is transmitted across large distances. Grain-oriented electrical steel strip is a key material found in distribution and power transformers as well as small transformers in laminated, wound or stamped form.

The production of grain-oriented electrical steel strip is known in the prior art and described in the European patent specification EP 1 752 548 A1, for example. Usually, the cold rolled strip subjected to final annealing is provided with an anti-corrosive coating prior to storage and transport to the buyer.

A multitude of pretreatment methods are known in the prior art, which provide suitable coatings for protection during transport.

Coating compositions for electrically insulating grain-oriented electrical steel strip are known in the prior art and usually contain chromium. Exemplary compositions are described in the German patent specification DE 2247269. Conventional coatings are cost-effective to produce, exhibit favorable properties in terms of corrosion protection, red heat stability, contraction strain, electrical insulation, adhesion, hygroscopic resistance, and tack. However, the chromium compounds that are present are harmful to people's health and the environment.

It is therefore desirable to replace chromium compounds in such compositions, without influencing the known favorable properties. While other metal compounds have been proposed for this purpose, among other things vanadium compounds, organic titanium complexes and permanganates of divalent metal ions, these compounds are either likewise toxic, have decreased stability, or are not available cost-effectively in larger quantities.

As a result, the need for cost-effectively available coating compositions that overcome the known disadvantages continues to exist.

The inventors of the present invention have now surprisingly found that water-based compositions containing phosphates, silicates, aluminum ions, as well as manganese, iron, zinc, calcium and/or magnesium ions, are suitable for replacing the known chromium-containing compositions, without adversely affecting the performance of the coating.

In a first aspect, the invention thus relates to a water-based chromium-free composition, comprising:
a) phosphoric acid and/or the acid anions thereof;
b) solvated aluminum cations;
c) solvated ions containing the elements Fe, Zn and/or Mn;
d) at least one silicate and/or at least one water-soluble silane or siloxane;

wherein the molar ratio of aluminum cations according to component b) to the amount of phosphoric acid and/or the acid anions thereof, in each case calculated as $PO_4$ according to component a), is no greater than 1.0, preferably no greater than 0.7, and no less than 0.1, wherein the molar ratio of the total amount of solvated ions according to component c), calculated as the total amount of the elements Fe, Zn and Mn, to the amount of phosphoric acid and/or the acid anions thereof according to component a), calculated as $PO_4$, is no greater than 1.0, preferably no greater than 0.7, and no less than 0.1, and wherein the molar ratio of silicates, silanes or siloxanes, calculated as $SiO_2$ according to component d), to the amount of phosphoric acid and/or the acid anions thereof, calculated as $PO_4$ according to component a), is no greater than 3.0, preferably no greater than 2.0, particularly preferably no greater than 1.0, and no less than 0.2.

In a further aspect, the invention relates to a method for coating the surface of a metallic material, characterized in that the surface of the metallic material is brought in contact with a composition as described herein, and to the metallic materials thus obtained, in particular steel strips, and still more preferably grain-oriented electrical steel strip.

Finally, a further aspect of the invention is directed to the steel strip comprising an inorganic first coating, substantially composed of magnesium oxide, on the metallic surface and, on this first coating, an inorganic second coating, wherein the inorganic second coating is substantially composed of silicates and an anion matrix of phosphates, which are applied according to the method described herein. The steel strip is preferably grain-oriented electrical steel strip.

The term "chromium-free" as used herein in connection with the described compositions denotes that the composition comprises less than 100 ppm, preferably less than 10 ppm, particularly preferably less than 1 ppm, based on the total composition of compounds of the element that is chromium, in each case calculated as $Cr_2O_3$.

"Water-based" as used herein in connection with the described compositions denotes that the composition is liquid and comprises water as the primary solvent. In different embodiments, at least 50% by volume, preferably at least 70% by volume, still more preferably at least 90% by volume of the solvent of the compositions is water.

"Water-soluble" as used herein in connection with the compounds contained in the compositions denotes that the solubility of such compounds at a temperature of 20° C. is at least $5 \cdot 10^{-2}$ mole in one kilogram of water having a conductivity of no more than 1 $\mu Scm^{-1}$.

The phosphoric acid and the acid anions thereof are preferably orthophosphoric acid ($H_3PO_4$) and the corresponding dihydrogen phosphates ($H_2PO_4^-$), monohydrogen phosphates ($HPO_4^{2-}$) and orthophosphates ($PO_4^{3-}$). The dihydrogen phosphates are also referred to as primary phosphates herein, the hydrogen phosphates as secondary phosphates, and the orthophosphates as tertiary phosphates.

Preferred sources for the phosphoric acid and the acid anions thereof are the corresponding phosphate salts with metal ions, in particular primary and secondary phosphates, particularly preferably the primary phosphates. The metal ions are preferably selected from aluminum and manganese, optionally also calcium and magnesium. In particular aluminum phosphate and manganese phosphate, and preferably the primary phosphates thereof, are preferably used.

Correspondingly, the water-soluble monohydrogen and dihydrogen phosphates can be used as a source for solvated ions of component b). In preferred embodiments of the invention, components a) and b) stem at least partially from solvated primary aluminum phosphate ($Al(H_2PO_4)_3$). Likewise, components a) and c) can stem at least partially from solvated primary manganese phosphate ($Mn(H_2PO_4)_2$).

Sources for components b) and c), for component c) in particular, can alternatively also be water-soluble inorganic compounds, which preferably comprise anions that are selected from hydroxides, oxides, carbonates, molybdates, pyrophosphates, sulfates and nitrates, as well as from oxoanions of the elements Fe and Mn such as ferrates and manganates. Particularly preferred are those water-soluble inorganic compound-based sources which act in an oxidizing manner or contain anions acting in an oxidizing manner. Such anions include, but are not limited to, ferrates, molybdates, manganates and nitrates. Exemplary sources for component c) are thus ZnO, $Zn(NO_3)_2$, $MnCO_3$ and $KMnO_4$.

In different embodiments of the compositions, solvated ions of the element zinc are present as component c). Such compositions preferably comprise at least one further solvated ion of the remaining elements according to component c). In this way, in particular the creation of hydrogen sulfide and any unpleasant odor associated therewith when the composition according to the invention is brought in contact with grain-oriented electrical steel is suppressed. In such embodiments of the composition according to the invention, the molar ratio of solvated aluminum cations according to component b) to solvated ions of the element zinc according to component c) is preferably no less than 3, however preferably no greater than 20, particularly preferably no greater than 12. In particular solvated ions of the element manganese are preferably additionally present as a further solvated ion of the remaining elements according to component c), wherein the molar ratio of solvated aluminum cations according to component b) to solvated ions of the element manganese according to component c) is preferably no less than 3, however preferably no greater than 20, particularly preferably no greater than 12. The simultaneous presence of solvated ions of the element manganese and of the element zinc improves in particular the alkali stability of coatings, which are produced using such preferred compositions according to the invention, on steel.

Moreover, compositions according to the invention that are preferred are those that additionally contain solvated cations of the elements Mg and/or Ca as a further component e), wherein the molar ratio of solvated aluminum cations according to component b) to solvated cations of the elements Mg and/or Ca according to component e) is preferably no less than 0.3, particularly preferably no less than 0.6, however preferably no greater than 6, particularly preferably no greater than 3. This brings about a further significant increase in the alkali stability of coatings, which are produced using compositions according to the invention, on steel. In this connection, the presence of solvated cations of the element Mg as component e) of compositions according to the invention is particularly preferred. Water-soluble monohydrogen and dihydrogen phosphates and/or water-soluble hydroxides are preferably used as a source for the solvated cations according to component e).

In different embodiments of the invention, the compositions in total comprise less than 1 g/kg, preferably less than 100 ppm, of water-soluble compounds of the element boron. In further embodiments, the compositions in total comprise less than 100 ppm, preferably less than 10 ppm, in particular preferably less than 1 ppm, of water-soluble compounds of the elements Zr, Ti and/or Hf.

Preferably no compounds that release halide ions are used as a source for the solvated cations of components b) and c), and the content of halide ions in the composition is preferably less than 100 ppm, particularly preferably less than 10 ppm, most particularly preferably less than 1 ppm.

The silanes or siloxanes that may be used in the compositions described herein are in particular organosilanes, which each comprise at least one hydrolyzable substituent that is cleaved to give alcohol during hydrolysis. While it is also possible according to the invention to use tetraalkoxylated silanes, it is preferred for the silanes/siloxanes to carry at least one, preferably one to three, non-hydrolyzable substituents at the respective silicon atom, wherein the total number of substituents at the respective silicon atoms of the organosilanes is four. Preferred organosilanes within the meaning of the present invention thus comprise at least one covalent Si—C bond, by way of which a so-called "non-hydrolyzable substituent" is bound to the silicon atom. Suitable organosilanes can comprise one or more, preferably primary, amino groups.

The hydrolyzable substituents of the organosilanes (A) cleave to give alcohols during condensation and/or hydrolysis which preferably have a boiling point of 100° C. at an atmospheric pressure of 1 bar. In preferred embodiments, the hydrolyzable substituents of the organosilanes of the compositions according to the invention are thus selected from methoxy, ethoxy and/or propoxy groups, in particular from methoxy groups.

Particularly suited representatives of the organosilanes (A) in compositions according to the invention are selected from aminosilanes of the general chemical formula (I):

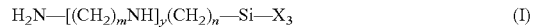

$$H_2N-[(CH_2)_m NH]_y(CH_2)_n-Si-X_3 \tag{I}$$

wherein the substituents X are each selected independently of each other from alkoxy groups having no more than four, preferably no more than two, carbon atoms, m and n each independently of each other are integers in the range of 1 to 4, and y is an integer if the range of 0 to 8, preferably in the range of 1 to 5. Preferred representatives of the organosilanes (A) of the general chemical formula (I) are 3-(diethylenetriamino)propyltrimethoxysilane, 3-(ethylenediamino)propyltrimethoxysilane, 3-aminopropyltrimethoxysilane, 3-(diethylenetriamino)propyltriethoxysilane, 3-(ethylenediamino) propyltriethoxysilane and 3-aminopropyltriethoxysilane, 3-(diethylenetriamino)propyltrimethoxysilane being particularly preferred.

Moreover, small amounts of cross-linking polynuclear organosilanes may be present in the compositions described herein. Thus, at least binuclear organosilanes may additionally be present in a preferred composition, in which each of the silyl units has at least two hydrolyzable substituents and the silyl units are connected to one another by way of at least one non-hydrolyzable dialkyleneamine unit; the dialkyleneamine unit particularly preferably consists of no more than 10 carbon atoms. Preferred representatives of these polynuclear organosilanes are bis(3-triethoxysilylpropyl)amine, bis(3-trimethoxysilylpropyl)amine.

Alternatively, it is also possible to use siloxanes in which the silyl units are linked to each other by way of oxygen atoms.

The silicates contained in the compositions according to the invention may be water-glasses, which is to say vitreous, this being amorphous, water-soluble silicates, or the aqueous solutions thereof, solidified from a melt. Preferred water-glasses in the compositions described herein are those in which the molar ratio of $SiO_2$ to $M_2O$ is at least 5:2, but preferably no greater than 5:1, M being selected from alkali metals and/or quaternary ammonium compounds, particularly preferably from potassium and/or sodium.

Alternatively, it is possible to use other silicates known to a person skilled in the art.

The silicates can be used in the form of aqueous solutions or else in the form of dispersions.

In different embodiments, it is also possible to use aqueous dispersions of silica ($SiO_2$) as component d).

If component d) is used in the form of an aqueous dispersion, the particles have a D90 value of no more than 500 nm, preferably of no more than 300 nm, and particularly preferably of no more than 200 nm. The D90 value indicates that 90% by volume of the dispersed silicate particles have a particle size below the indicated value. The D90 value is ascertained based on volume-weighted cumulative particle size distributions, wherein the particle size distribution curve must be measured using dynamic light scattering methods.

The pH value of the composition is preferably not below 0.5, particularly preferably not below 1, and preferably not above 3.0, particularly preferably not above 2.5, most particularly preferably not above 2.0.

In the different embodiments of the invention, the content of phosphoric acid and/or of the acid anions thereof in the composition, in each case calculated as $PO_4$, is at least 10 g/kg, preferably at least 20 g/kg, however preferably no more than 500 g/kg, particularly preferably no more than 200 g/kg.

It is furthermore preferred for the compositions described herein to comprise less than 100 ppm, particularly preferably less than 10 ppm, most particularly preferably less than 1 ppm, of organic polymers having a weight-average molecular mass of more than 500 u.

The compositions described herein can be produced using methods known in the prior art. In different embodiments, such a method includes charging an aqueous solution of components a) and b), and subsequently adding component c), and optionally component e), in the form of a solid or an aqueous solution. The resulting solution/mixture is mixed/stirred until a clear solution is obtained. Component d) is added in the next step, likewise in the form of an aqueous solution or dispersion, and is again mixed/stirred. The composition is then ready to be applied to metallic materials, in particular electrical steel strip.

In the methods described herein for coating the surface of a metallic material using the compositions described herein, the metallic material is brought in contact with the compositions. Bringing the composition in contact with the surface of the material may be carried out by way of all known methods and includes, but is not limited to, spraying, immersing, roller or roll application, printing or the like.

The composition is preferably applied in the form of a wet film and is subsequently dried. The wet film can have a layer thickness of 0.5 to 10 µm. In particular, the wet film is applied in such an amount that, after drying, a dry film layer thickness of at least 0.5 µm, preferably of at least 1 µm, however preferably of no more than 5 µm is achieved. Drying of the wet film can be carried out by supplying heat, preferably by annealing the material such that a peak metal temperature of at least 500° C., particularly preferably of at least 700° C., however preferably of no more than 1200° C., particularly preferably no more than 1000° C. is reached. Annealing is preferably carried out for a time period of 1 to 1000, preferably 10 to 100 seconds.

The metallic material, which is coated by way of the methods described herein, may be a flat product, preferably steel strip. In different embodiments, the steel strip has the following composition:

2.5 to 4.00% by weight silicon;
preferably 0.005 to 0.1% by weight carbon;
and optionally respectively:
up to 0.3% by weight manganese;
up to 0.05% by weight titanium;
up to 0.3% by weight phosphorus;
up to 0.3% by weight sulfur and/or selenium;
up to 0.2% by weight bismuth, antimony, tin, arsenic and/or tellurium;
up to 0.5% by weight copper, nickel, chromium, cobalt, molybdenum;
up to 0.012% by weight boron, vanadium and/or niobium.

The steel strip is preferably grain-oriented electrical steel strip.

The steel strips rendered anti-corrosive by way of such coating methods are likewise an integral part of the invention. On the surface, they comprise an inorganic coating made of silicates and an anion matrix made of phosphates, which is characterized by the above-mentioned advantages and in particular contains no chromium.

In different embodiments, the steel strip may include an inorganic coating substantially composed of magnesium oxide. "Substantially" in this connection means that the inorganic coating contains at least 80% by weight, preferably at least 90% by weight, magnesium oxide, calculated as MgO. The first layer preferably has a layer thickness of 0.5 to 5 µm.

The composition according to the invention is then applied to this first coating. The invention thus also relates to steel strip comprising an inorganic first coating, substantially composed of magnesium oxide, on the metallic surface and, on this first coating, an inorganic second coating, wherein the inorganic second coating is substantially composed of silicates and an anion matrix of phosphates and is produced by way of the methods described herein. The second layer preferably comprises at least 30% by weight phosphate, calculated as $PO_4$, and at least 20% by weight silicate, calculated as $SiO_4$. The second layer preferably likewise has a layer thickness of 0.5 to 5 µm.

EXEMPLARY EMBODIMENTS

Coatings according to the invention of grain-oriented steel strip were produced using compositions B1 to B4 according to the invention.

Composition B1:
22.8 g phosphoric acid (75% by weight);
4.4 g aluminum hydroxide;
2.0 g manganese dihydrogen phosphate;
43.0 g silica dispersion (30% by weight);

27.4 g water
Composition B2:
23.0 g phosphoric acid (75% by weight);
4.4 g aluminum hydroxide;
2.0 g manganese dihydrogen phosphate;
1.2 g zinc oxide
43.0 g silica dispersion (30% by weight);
27.6 g water
Composition B3:
21.2 g phosphoric acid (75% by weight);
2.2 g aluminum hydroxide;
1.1 g magnesium oxide; 2.0 g manganese dihydrogen phosphate;
0.5 g zinc nitrate;
43.0 g silica dispersion (30% by weight);
24.0 g water
Composition B4:
20.9 g phosphoric acid (75% by weight);
2.0 g aluminum hydroxide;
1.5 g magnesium oxide;
1.0 g manganese dihydrogen phosphate;
0.3 g zinc nitrate;
43.0 g silica dispersion (30% by weight);
23.0 g water
Comparison Composition V1 (Contains Chromium):
22.4 g phosphoric acid (75% by weight);
4.2 g aluminum hydroxide;
6.9 g chromium oxide solution (45% by weight);
43.0 g silica dispersion (30% by weight);
36.0 g water
Comparison Composition V2 (Chromium-Free):
22.2 g phosphoric acid (75% by weight);
4.4 g aluminum hydroxide;
43.0 g silica dispersion (30% by weight);
23.2 g water
Comparison Composition V3 (without Aluminum):
25.9 g phosphoric acid (75% by weight);
3.5 g magnesium oxide;
2.0 g manganese dihydrogen phosphate;
0.5 g zinc nitrate;
43.0 g silica dispersion (30% by weight);
25.2 g water The concentrations of the respective elements documented in Table 1 were thus present in compositions B1 to B4 and V2 and V3.

TABLE 1

Concentrations of components a) to e) in $10^{-4}$ mol/g in the respective compositions

| | Al | Zn | Mn | Mg | PO$_4$ | SiO$_2$ |
|---|---|---|---|---|---|---|
| B1 | 5.65 | — | 0.80 | — | 19.3 | 21.6 |
| B2 | 5.61 | 1.45 | 0.80 | — | 19.2 | 21.2 |
| B3 | 3.00 | 0.32 | 0.85 | 3.00 | 19.1 | 23.0 |
| B4 | 2.77 | 0.15 | 0.44 | 3.95 | 18.4 | 23.4 |
| V2 | 6.12 | — | — | — | 18.3 | 23.2 |
| V3 | — | 0.28 | 0.80 | 8.59 | 21.6 | 21.5 |

All compositions were evenly applied to the surface of grain-oriented electrical steel strip using a pinch coater, the metal sheets were annealed at 850° C. for 90 seconds. The layer thickness of the dry film was 2 to 3 μm. Subsequently, the properties of the metal sheets thus coated were analyzed. The results are shown in Table 2.

TABLE 2

Concentrations of components a) to e) in $10^4$ mol/g in the respective compositions

| Elements | | Oxidizing[1] | Odor[2] | Appearance[3] | Alkali resistance[4] |
|---|---|---|---|---|---|
| B1 | Al, Mn | − | − | 3 | 3 |
| B2 | Al, Mn, Zn | − | + | 3 | 4 |
| B3 | Al, Mn, Zn, Mg | + | + | 1 | 1 |
| B4 | Al, Mn, Zn, Mg | + | + | 2 | 1 |
| V1 | Al, Cr | − | + | 1 | 1 |
| V2 | Al | − | − | 4 | 5 |
| V3 | Mn, Zn, Mg | + | + | 5 | 3 |

[1]oxidizing anions are present (+/yes; −/no)
[2]hydrogen sulfide odor detectable (+/no; −/yes)
[3]The metal sheets should be colorless and have a metallic sheen after coating and drying in the furnace. The evaluation was made based on the following scale: (1) clear and shiny (2) clear, but dull (3) slightly milky and dull (4) milky and dull (5) white coating
[4]The alkali resistance of the coating was tested by way of abrasion using cotton wool saturated with a 20% by weight KOH solution. The evaluation was made after 50 double strokes based on the following scale: (1) no change in the coating (2) minimal visible change without change in the hue (3) visible change with slight change in the hue (4) clearly visible change with clear change in the hue (5) considerable change in the coating and hue This demonstrates that compositions B1 to B4 according to the invention always supply coatings that have a sufficiently good appearance. In addition, the presence of zinc in compositions B2 to B4 is able to suppress the development of hydrogen sulfide in the coating process so much that odor is no longer noticed. If moreover the element magnesium is added, as was in the case in compositions B3 and B3 according to the invention, coatings having a flawless appearance are achieved, which furthermore exhibit alkali resistance as can otherwise only be achieved by chromium-containing compositions (V1) known from the prior art.

What is claimed is:

1. A water-based chromium-free composition, comprising:
   a) phosphoric acid and/or the acid anions thereof;
   b) solvated aluminum cations;
   c) solvated ions containing Zn and Mn and oxidizing counter-anions thereto and optionally Fe;
   d) at least one silicate and/or at least one water-soluble silane or siloxane;
   e) solvated cations of the element Mg wherein a molar ratio of the solvated aluminum cations of component b) to solvated cations of the element Mg is no less than 0.6 and no greater than 3;
   with the proviso that the water-based chromium-free composition is also free of permanganates of divalent metals;
   wherein a molar ratio of the aluminum cations according to component b) to the phosphoric acid and/or the acid anions thereof, in each case calculated as PO$_4$, according to component a), is no greater than 1.0 and no less than 0.1;
   wherein a molar ratio of a total amount of the solvated ions according to component c), calculated as the total amount of the elements Fe, Zn and Mn, to the phosphoric acid and/or the acid anions thereof according to component a), calculated as PO$_4$, is no greater than 1.0 and no less than 0.1; and
   wherein a molar ratio of the silicates, silanes or siloxanes, calculated as SiO$_2$, according to component d), to the phosphoric acid and/or the acid anions thereof, calculated as PO$_4$, according to component a), is no greater than 3.0 and no less than 0.2.

2. The composition according to claim 1, wherein phosphoric acid and/or of the acid anions thereof, in each case calculated as PO$_4$, is present in the composition in an amount of at least 10 g/kg and not more than 500 g/kg.

3. The composition according to according to claim 1, wherein dispersed silicates, if present, in the composition has a D90 value of no more than 500 nm.

4. The composition according to claim 1, wherein the molar ratio of solvated aluminum cations according to component b) to solvated ions of the element Zn according to component c) is no less than 3 and no greater than 20.

5. The composition according to claim 4, wherein the molar ratio of solvated aluminum cations according to component b) to solvated ions of the element manganese according to component c) is no less than 1 and no greater than 10.

6. The composition according to claim 1, wherein in total less than 1 g/kg of water-soluble compounds of the element boron is present.

7. The composition according to claim 1, wherein in total less than 100 ppm of water-soluble compounds of the elements Zr, Ti and/or Hf is present.

8. The composition according to claim 1, wherein no compounds that release halide ions are present as a source for the solvated cations of components b) and c).

9. The composition according to claim 1, wherein component d) consists of the at least one water-soluble silane.

10. The composition according to claim 9, wherein in total less than 100 ppm of water-soluble compounds of the elements Zr, Ti and/or Hf is present in the composition;
wherein the at least one water-soluble silane is an organosilane selected from aminosilanes of the general chemical formula (I):

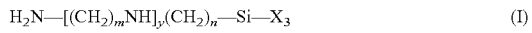
$$H_2N-[(CH_2)_mNH]_y(CH_2)_n-Si-X_3 \quad (I)$$

wherein the substituents „X" are each selected independently of each other from alkoxy groups having no more than four carbon atoms;
m and n each independently of each other are integers in a range of 1 to 4; and
y is an integer in a range of 0 to 8.

11. A method for coating a surface of a metallic material, comprising a step of contacting the surface of the metallic material with the composition according to claim 1.

12. The method according to claim 11, wherein the contacting step applies a wet film of the composition onto the surface of the metallic material, the method further comprising a step of drying said wet film.

13. The method according to claim 12, wherein the drying step comprises supplying heat such that a peak metal temperature of at least 500° C. but no more than 1200° C. is reached.

14. The method according to claim 12, wherein a wet film is applied in such an amount that, after drying, a dry film layer thickness of at least 0.5 µm but no more than 5 µm is achieved.

15. The method according to claim 11, wherein the metallic material is a flat product.

16. The method according to claim 15, wherein the flat product is a steel strip which comprises an inorganic coating substantially composed of magnesium oxide.

17. A steel strip comprising a metallic surface, an inorganic first coating, substantially composed of magnesium oxide, on the metallic surface and, on said inorganic first coating, an inorganic second coating, wherein the inorganic second coating is substantially composed of silicates and an anion matrix of phosphates, obtained by the method according to claim 14.

18. A water-based chromium-free composition, comprising water and:
a) phosphoric acid and/or acid anions thereof;
b) water-soluble inorganic compounds of Al selected from the group consisting of hydroxides phosphates, pyrophosphates, and combinations thereof;
c) water-soluble inorganic compounds of Mn, and optionally of Fe, selected from hydroxides, phosphates; pyrophosphates, and combinations thereof;
d) water-soluble inorganic compounds of Mg selected from oxides, hydroxides, phosphates and combinations thereof;
e) water-soluble inorganic compounds of Zn selected from ZnO, Zn(NO$_3$)$_2$ and combinations thereof
f) at least one silicate and/or at least one water-soluble silane or siloxane;
with the proviso that the composition contains no permanganates of divalent metals and no sulphates;
wherein pH value of the composition is not below 0.5, and not above 3.0;
wherein a molar ratio of solvated Al cations from b) to the phosphoric acid and/or phosphoric acid anions, in each case calculated as PO$_4$, is no greater than 1.0 and no less than 0.1;
wherein a molar ratio of a total amount of solvated cations of Zn from c), solvated cations of Mn from d) and, if present solvated cations of Fe from d), calculated as the total amount of the elements Zn, Mn and, if present Fe, to the phosphoric acid and/or the phosphoric acid anions thereof, calculated as PO$_4$, is no greater than 1.0 and no less than 0.1;
wherein a molar ratio of the silicates, silanes or siloxanes, calculated as SiO$_2$, to the phosphoric acid and/or the phosphoric acid anions thereof, calculated as PO$_4$, is no greater than 3.0 and no less than 0.2;
wherein a molar ratio of the solvated Al cations from b) to the solvated cations of Zn from c) is no less than 3, and no greater than 20;
wherein a molar ratio of the solvated Al cations from b) to the solvated cations of Mn from d) is no less than 3, and no greater than 20;
wherein a molar ratio of the solvated Al cations from b) to the solvated cations of Mg from e) is no less than 0.6 and no greater than 3.

19. The composition according to claim 18, wherein e) is Zn(NO$_3$)$_2$.

20. The composition according to claim 18, wherein:
a) is phosphoric acid;
b) is aluminum hydroxide;
c) is manganese dihydrogen phosphate;
d) is magnesium oxide;
e) is zinc nitrate.

* * * * *